(12) United States Patent
Van Dyck

(10) Patent No.: US 9,925,698 B2
(45) Date of Patent: Mar. 27, 2018

(54) METHOD AND MOULD FOR PRODUCING A PANEL ASSEMBLY

(71) Applicant: Webasto SE, Stockdorf (DE)

(72) Inventor: Johan Ria Hugo Van Dyck, Schoten (BE)

(73) Assignee: Webasto SE (DE)

( * ) Notice: Subject to any disclaimer, the term of this patent is extended or adjusted under 35 U.S.C. 154(b) by 330 days.

(21) Appl. No.: 14/782,994

(22) PCT Filed: Mar. 31, 2014

(86) PCT No.: PCT/EP2014/056455
§ 371 (c)(1),
(2) Date: Oct. 7, 2015

(87) PCT Pub. No.: WO2014/177333
PCT Pub. Date: Nov. 6, 2014

(65) Prior Publication Data
US 2016/0031124 A1 Feb. 4, 2016

(51) Int. Cl.
*B29C 45/20* (2006.01)
*B29C 39/02* (2006.01)
(Continued)

(52) U.S. Cl.
CPC .......... *B29C 39/025* (2013.01); *B29C 31/044* (2013.01); *B29C 33/0044* (2013.01);
(Continued)

(58) Field of Classification Search
None
See application file for complete search history.

(56) References Cited

U.S. PATENT DOCUMENTS

| 5,362,428 A | 11/1994 | Tsujino et al. |
| 5,421,940 A | 6/1995 | Cornils et al. |

(Continued)

FOREIGN PATENT DOCUMENTS

| EP | 0 355 209 B1 | 2/1993 |
| EP | 0 379 246 B1 | 8/1994 |

(Continued)

OTHER PUBLICATIONS

PCT International Search Report for International Application No. PCT/EP2014/056455 dated May 13, 2014 (3 pages).

(Continued)

*Primary Examiner* — Edmund Lee
(74) *Attorney, Agent, or Firm* — Fitch, Even, Tabin & Flannery, LLP

(57) ABSTRACT

Mold for producing a panel assembly comprising a panel and a gasket, which gasket is adhered to the panel, and extends along at least a portion of the periphery thereof, the mold comprising a first mold part and a second mold part that are formed such that the panel can been closed thereby forming a closed cavity the inner boundaries of which are formed by a first mold surface, a second mold surface and the periphery of the panel, and wherein the second mold part comprises a resilient lip extending along the periphery, the resilient lip being provided for being displaced by an applicator device to provide access to the closed cavity.

15 Claims, 3 Drawing Sheets

(51) Int. Cl.

| | |
|---|---|
| *B29C 45/14* | (2006.01) |
| *B29C 47/02* | (2006.01) |
| *B29C 47/08* | (2006.01) |
| *B29C 47/12* | (2006.01) |
| *B29C 31/04* | (2006.01) |
| *B29C 33/00* | (2006.01) |
| *B29C 44/38* | (2006.01) |
| *B29C 39/10* | (2006.01) |
| *B29C 39/24* | (2006.01) |
| *B29C 39/26* | (2006.01) |
| *B29C 45/26* | (2006.01) |
| *B29C 70/76* | (2006.01) |
| *B29K 75/00* | (2006.01) |
| *B29K 105/04* | (2006.01) |
| *B29K 709/08* | (2006.01) |
| *B29L 7/00* | (2006.01) |
| *B29L 31/26* | (2006.01) |
| *B29L 31/00* | (2006.01) |

(52) U.S. Cl.
CPC .............. *B29C 39/10* (2013.01); *B29C 39/24* (2013.01); *B29C 39/26* (2013.01); *B29C 44/386* (2013.01); *B29C 45/14336* (2013.01); *B29C 45/14418* (2013.01); *B29C 45/20* (2013.01); *B29C 45/26* (2013.01); *B29C 47/02* (2013.01); *B29C 47/0842* (2013.01); *B29C 47/12* (2013.01); *B29C 70/763* (2013.01); *B29C 2045/14459* (2013.01); *B29C 2045/2697* (2013.01); *B29K 2075/00* (2013.01); *B29K 2105/04* (2013.01); *B29K 2709/08* (2013.01); *B29K 2827/18* (2013.01); *B29L 2007/002* (2013.01); *B29L 2031/265* (2013.01); *B29L 2031/778* (2013.01)

(56) References Cited

U.S. PATENT DOCUMENTS

| | | |
|---|---|---|
| 5,676,898 A | 10/1997 | Yokota et al. |
| 5,851,470 A | 12/1998 | Yokota et al. |
| 6,228,305 B1 | 5/2001 | Okuda et al. |
| 2007/0186496 A1 | 8/2007 | De Winter et al. |

FOREIGN PATENT DOCUMENTS

| | | | |
|---|---|---|---|
| EP | 0673742 A1 | | 9/1995 |
| EP | 1 577 080 B1 | | 11/2006 |
| EP | 2923812 | * | 9/2015 |
| JP | S60-34813 U | | 3/1985 |
| JP | H06-270170 A | | 9/1994 |
| JP | H10-508801 A | | 9/1998 |
| JP | 2002096340 A | | 4/2002 |
| JP | 2005-047257 A | | 2/2005 |
| WO | 98/14492 A1 | | 4/1998 |

OTHER PUBLICATIONS

Database WPI, Week 200520, Thomson Scientific, London, Great Britain, XP002723754, Abstract for JP 2005-047257 A (2 pages).
Examination Report for corresponding JP Patent Application dated Dec. 14, 2018.

* cited by examiner

METHOD AND MOULD FOR PRODUCING A PANEL ASSEMBLY

CROSS-REFERENCE TO RELATED APPLICATIONS

This application is a U.S. national phase application filed under 35 U.S.C. § 371 of International Application PCT/EP2014/056455, filed Mar. 31, 2014, designating the United States, which claims priority from European Application EP 13166057.3, filed Apr. 30, 2013, which are all hereby incorporated herein by reference in their entirety.

FIELD

The present invention relates to a method for producing a panel assembly comprising a panel and a gasket, which gasket is adhered to the panel, extends along at least a portion of the periphery thereof and has a surface moulded against a solid surface, the method comprising the steps of:
Providing a first mould part having a first mould surface forming a first part of said solid surface;
Placing the panel and the first mould surface against one another;
Producing said gasket, by means of an applicator device moving along at least said portion of the periphery of the panel, forming a second part of said solid surface, while applying a composition onto said solid surface, the gasket being produced by allowing said composition to cure against said solid surface;
Removing the panel and the gasket produced thereon from the mould;
Wherein the composition has a dynamic viscosity, measured at a shear rate of 1/s, lower than 35000 mPa·s when it arrives onto at least a portion of the solid surface.

BACKGROUND

The panel is usually a glass panel such as a window panel arranged to be mounted in a car body or a solar panel to be mounted in a frame. In order to mount the window panel in a car body, or to mount the solar panel in the frame, it is provided with a gasket extending along the periphery of the panel. In prior art methods, this gasket is produced directly onto the window panel, either by an extrusion or by an injection moulding process. Such extrusion or injection processes have significant disadvantages.

In the extrusion process, a profiled strand of a reacting polymer system or of a thermoplastic polymer is extruded and deposited onto the edge of the window panel by means of a calibrated nozzle guided by means of an automatic handling device. The reacting polymer system or the thermoplastic material is applied in a pasty or kneadable state, i.e. in a highly viscous state, so that it retains its shape when being applied on the window panel instead of flowing out. According to U.S. Pat. No. 5,362,428 the extruded synthetic resin should have a viscosity in the range of 300,000 to 10,000,000 mPa·s (=cP), and more preferably in the range of 600,000 to 3,000,000 mPa·s (at a shear rate of 1/s) in order to enable to form the synthetic resin into a specified shape or to keep the specified shape until the extruded synthetic resin is cured. An advantage of the extrusion process is that it involves much lower tool costs than the injection moulding process but it has a number of drawbacks. First of all the seam location between the start and the end of the extruded profiled strand must be finished afterwards in an additional process step. Secondly, the extruded strand has a constant cross-sectional profile. Thirdly, it is not possible to extrude around sharp corners so that, at the location of such corners, also an additional finishing step is required. Moreover, the surface of an extruded gasket has only a modest quality.

In order to obtain a window assembly with a gasket of a high dimensional accuracy, U.S. Pat. No. 5,421,940 discloses to extrude a thermoplastic polymer onto the periphery of the window panel and onto an open mould surface extending beyond the periphery of the window panel. A difference with the other extrusion processes is that only a portion of the surface of the thermoplastic material is shaped by the extrusion nozzle, the other part of this surface being moulded against the mould surface. Since the thermoplastic material is partially shaped by the extrusion nozzle, it still should have a quite high viscosity to retain its shape. A drawback of the method disclosed in U.S. Pat. No. 5,421,940 is therefore that the thermoplastic material has to be applied with a sufficiently high pressure onto the mould surface in order to shape the viscous thermoplastic material against the mould surface and against the edge of the panel. In order to be able to apply the required pressure onto the thermoplastic material in the mould, the extrusion nozzle has to be pressed quite strongly against the upper side of the glass panel. In the embodiment illustrated in FIG. 5 of abovementioned patent, wherein not only the front but also the back of the gasket is moulded against the mould surface, the extrusion nozzle has moreover even to fit exactly in the gap between the mould surface and the upper surface of the glass panel. It is clear that the risk on glass breakage is increased by the pressure exerted by the extrusion nozzle onto the glass panel.

Another drawback of the method disclosed in U.S. Pat. No. 5,421,940 is that the pressure which can be exerted onto the thermoplastic material in the mould, is limited since the material is not injected into a completely closed mould. Consequently, compared to an injection moulding process, the surface quality will be worse. Especially when the mould surface shows a fine texture, the thermoplastic material may be too viscous to take over this texture. Moreover, air bubbles may remain present at the interface between the mould surface and the thermoplastic material. In order to guarantee that the surface of the mould shall be completely wetted with the thermoplastic polymer, U.S. Pat. No. 5,421,940 teaches to heat the mould. However, the mould is only heated to a temperature lower than the temperature of the extruded thermoplastic polymer so that the polymer still remains highly viscous. Moreover, by heating the mould, the production cycle time is increased since the polymer must be allowed to set before the window assembly can be removed from the mould.

In a reaction injection moulding (RIM) process, a curable composition is injected under pressure in a closed mould cavity formed around the periphery of the window panel. An advantage of such a RIM process is that low viscous curable compositions may be used (see for example WO 98/14492 disclosing preferred viscosities of polyol and isocyanate blends of between 150 and 2500 mPa·s at application temperature). Advantages of such an injection moulding process are the better surface quality of the gaskets (mainly due to the much lower viscosity of the injected reactive mixture) and the larger design freedom. Important drawbacks of an injection moulding process are however the high tooling costs and also the time and effort needed to make and modify the injection moulds (either when the mould surface is damaged or when a new design is needed). The moulds have indeed to be made of a robust material in order to withstand the relatively high temperature and pressure of the process. This appears for example from EP-B-0 355 209 which discloses to replace the elastomeric seals between the mould surface and the glass pane by a metal ring since elastomeric seals have the disadvantage of imperfect parting lines due to the fact that they tend to deform when too much pressure is exerted thereon. Moreover, a very accurate milling of the mould is needed to avoid glass breakage during mould closure and to finetune contact area between the mould surface and the window panel, so that leakage of the injected material is prevented. These high tooling costs usually impose limits on the production capacity of a RIM process. A further drawback of a RIM process is that an external release agent has to be applied onto the mould surface. This not only involves an extra process step (longer cycle time) but also causes surface defects on the gasket, such as a too low gloss of a high gloss gasket, due to accumulation of this release agent in the mould. Another drawback of a RIM process is finally that the mould cavity has to show a minimum height so that it can be filled completely, i.e. substantially without voids, with the curable composition.

U.S. Pat. No. 6,228,305 discloses still another process to produce a gasket on the periphery of a window panel. In accordance with this process, a window panel is positioned on a lower mould section. Subsequently, a highly viscous adhesive is applied (extruded) onto the edge of the window panel and a highly viscous foam material onto the mould surface which extends along the edge of the window panel. Before the adhesive and the foaming material are completely cured, a pressure is exerted onto the adhesive and onto the foaming material by lowering an upper mould section onto the lower mould section in order to mould the adhesive and the foaming material into the desired form. Due to the fact that the foam material and the adhesive are highly viscous, a considerable pressure will be exerted on the foam material and onto the window panel. A drawback of the method disclosed in U.S. Pat. No. 6,228,305 is therefore that the mould has to be made again of a robust material resulting in the same drawbacks as mentioned hereabove for a RIM process (in particular high tooling costs, risk on glass breakage, . . . ). Moreover, due to the high viscosity of the moulding materials, and the fact that they even will have an increased viscosity when the required pressure is exerted onto the moulding material, the surface quality will not be as good as the surface quality of injection moulded articles, especially not when a fine surface texture has to be taken over from the mould surface.

EP1577080 is considered the closest prior art for the present invention since it discloses a method to produce a panel assembly with a gasket wherein the gasket is formed in an open mould. This allows to use a curable composition that has a dynamic viscosity measured at a shear rate of 1/s, lower than 35000 mPa·s when it arrives onto the mould surface. With such composition, a panel assembly which enables a higher design freedom and a better surface quality of the gasket can be produced compared to the common extrusion process, without involving however tooling costs which are as high as for RIM process. In contrast to the known injection moulding process wherein such less viscous curable compositions are used, the curable composition is not injected in a closed mould but it is applied, either directly or indirectly, on the panel and the mould surface by means of an applicator device moving along the periphery of the panel while applying the curable composition.

Since the curable composition of EP1577080 has a lower viscosity than the polymers used in the known extrusion processes, a better surface quality can be achieved without having to exert high pressures onto the curable composition. In particular, it is possible to take over the surface quality of polished moulds (glossy surface), of structured moulds (for example sandblasted mould surfaces) or of textured moulds (showing for example a leather texture). The curable composition is applied by means of a moving applicator device and in an open mould.

A drawback of forming the gasket in the open mould is that the outer shape and surface texture can only be designed for the part of the gasket that touches the open mould. This limits the application possibilities for the gasket and panel since parts of the shape and texture of the gasket cannot be predefined.

SUMMARY

It is an object of the present invention to provide a method for producing a panel assembly wherein the gasket form and surface texture can be more freely designed.

To this end, the method according to the invention further comprises:
Providing a second mould part having a second mould surface forming a third part of said solid surface; and
Placing the second mould part against the first mould part and the panel so that a closed cavity is formed the inner boundaries of which form said solid surface defining substantially the complete shape of the gasket;
wherein at least one of the first mould part and second mould part comprises a resilient lip extending along at least said portion of the periphery of the panel, the method further comprising while producing said gasket:
Displacing said resilient lip by said applicator device to provide access to the closed cavity.

By providing a second mould part, which is placed against the first mould part and the panel, a closed mould is obtained. This closed mould comprises a closed cavity that is formed by the combination of the first mould surface, the second mould surface, and the panel. Because the mould defines a closed cavity, every side of the gasket can be predefined and preformed. Where in the open mould (prior art) only the side of the gasket that is in contact with the mould surface can be predefined (the texture, shape, . . . are predefined via the mould surface), the closed cavity of the present invention allows to define the complete shape and the complete outer surface texture of the gasket including top and bottom surfaces. Closed moulds are known from various injection methods where a composition is injected into the closed mould under a high pressure. The composition that is used in the present invention, and of which advantages are known from the prior art, is not suitable for being injected under a high pressure. In the present invention, a resilient lip is provided on at least one of the first or second mould. The resilient lip is formed so that it closes the mould (the closed cavity) in a rest position. The resilient lip is further provided to be displaced by the applicator device, so that the applicator device gains access to the closed cavity. Such resilient lip allows the applicator device to move along the periphery of the panel, where a gasket is to be formed, while continuously displacing the resilient lip at the location of application of the composition. Thereby, where in an open mould the applicator device is allowed to spray the composition onto the mould, directly onto the application zone (moving along the periphery of the panel), the resilient lip according to the present invention allows the applicator device to move along the periphery to inject the composition into the mould directly in the application zone. Thereby, according to the invention, advantages of the closed mould injection technology (where all sides of the gasket can be predefined) and the advantages of the open mould technology with the claimed composition (high surface accuracy) are combined in the present invention.

When arriving onto the mould surface, i.e. when being applied onto a first portion thereof, the curable composition has to show the lower viscosity required by the present invention. When further covering the mould surface, the viscosity may already have been increased to a higher value due to (partial) curing of the curable composition. In a preferred embodiment, the viscosity of the curable composition remains however below the upper limits of the present invention until filling of a segment of the mould cavity with the curable composition is complete.

Preferably, the method further comprises further controlling a moving speed of the applicator device and a volumetric flow rate of the applying of the composition, such as to completely fill said closed cavity with said composition. By correlating the volumetric flow rate of the composition with the moving speed of the applicator device, thereby knowing the cross-sectional area of the closed cavity, the closed cavity can be completely filled without a significant overflow, and without a high filling pressure.

Preferably, the moving speed and/or volumetric flow rate is controlled, such that in a starting stage of the producing of the gasket, the volumetric flow rate is higher than the volume of the inner cavity that is passed at said moving speed, thereby providing an overdose of composition in the starting stage. By providing an overdose of composition in the starting stage, a starting zone of the closed cavity can be completely filled. Due to the low viscosity of the composition, the composition tends to flow out into any possible direction when it is injected into the cavity. By providing an overdose at a starting stage, the composition is allowed to flow out into two directions, and due to the overdose, still a stop is formed by the composition in the closed cavity at the starting zone, despite the flowing out of the composition. This stop prevents further flowing of the composition in the further filling process of the closed cavity.

Preferably, the moving speed and/or volumetric flow rate is controlled such that in a middle stage of the producing of the gasket, the volumetric flow rate is substantially equal to the volume of the inner cavity that is passed at said moving speed. In a middle stage of the producing of the gasket, the applicator device is moving along the periphery of the panel, while applying composition into the gasket via the resilient lip. Thereby, preferably a stop is formed in the cavity so that the further application of composition is allowed to completely fill the cavity. By correlating the volumetric flow rate with the volume of the inner cavity that is passed at the moving speed, an exact dose of composition is provided in the cavity to completely fill the cavity without significant overflow of composition. This allows an efficient filling of the cavity.

Preferably, the method comprises, before producing the gasket, positioning the mould such that the first segment of the portion of the periphery of the panel is arranged to be located lower than a second segment of the portion of the periphery of the panel. By positioning one portion of the mould lower than the other portion, the composition that is applied into the mould will tend to flow to this lowest portion. By filling the lower zones of the mould cavity, a stop is formed and a further cavity can be filled by moving the applicator device along the periphery of the panel while applying composition into the cavity, thereby gradually filling the cavity.

Preferably, the producing of the gasket starts at the first segment. By starting at the first segment, which is the segment that is arranged lower than other segments of the portion of the periphery of the panel, the composition is allowed to flow into this first segment at the start of the producing of the gasket, thereby forming a starting point of the gasket in the cavity.

Preferably the second mould part is movably mounted with respect to the first mould part and the method comprised before producing of the gasket, moving the second mould part towards the first mould part and the panel to form the closed cavity, and wherein the method comprises after the producing of the gasket, moving the second mould part away from the first mould part and the panel to open the closed cavity. By providing a mechanism to open and to close the cavity, production of the panel and gasket assembly can be at least partially automated.

Preferably, at least one of the first mould part and second mould part is formed by a resilient material having a Shore A hardness, smaller than 90. When the mould is made at least partially of a resilient material, the risk of breaking the panel (which is for example a glass panel) when closing the mould is reduced. Furthermore, such resilient mould can correctly seal against surfaces that are formed with less strict shap tolerances. Where flat glass panels for examples solar panels can be produced with very high dimensional accuracy, curved glass panels, for example car windows, are typically produced relatively less precise. Therefore, the mould for forming the gasket is preferably adapted to cooperate with less strict shape tolerances, while preventing leakage in every circumstance. By forming the mould of a resilient material, particularly in the areas of the mould that lay in contact or directly adjacent to the panel, the resilient material flexibility allows the mould to deform thereby perfectly fitting against the panel resulting in a complete leakage prevention.

Preferably, the applying step comprises the step of allowing the curable composition to float out of the closed cavity via an opening temporarily formed by the resilient lip. When curable composition is applied into the closed cavity via the applicator device, an excessive amount of curable composition is allowed to float out of the closed cavity via an opening that is formed by the resilient lip. Particularly, when an internal pressure is built up inside the closed cavity, the resilient lip will be pushed open by the internal pressure, thereby relieving the pressure by allowing composition to flow out through the so-formed opening. Thereby, the resilient lip provides in a mechanism to completely fill the closed cavity without the high pressures that are conventionally required to fill a closed cavity.

The invention further relates to a mould for producing a panel assembly comprising a panel and a gasket, which gasket is adhered to the panel, extends along at least a portion of the periphery thereof, and has a surface moulded against a solid surface, the mould comprising a first mould part having a first mould surface, and a second mould part having a second mould surface, the first and second mould part being formed such that at least said portion of the periphery of the panel can be enclosed, thereby forming a closed cavity, the inner boundaries of which are formed by a combination of the first mould surface, the second mould surface and the portion of the periphery of the panel, wherein the solid surface is formed by the inner boundaries of the cavity, and wherein at least one of the first mould part and the second mould part comprises a resilient lip extending along at least said portion of the periphery of the panel, the resilient lip being provided for being displaced by an applicator device to provide access to the closed cavity.

As explained above in relation to the method according to the invention, the mould according to the invention equally allows to produce a gasket in a closed mould using mainly open mould technology. Because of the closed mould, the complete surface and shape of the gasket can be predefined. The resilient lip extending along the periphery of the panel allows the composition to be applied into the cavity at a low pressure, thus allowing to use a composition having a low viscosity (open mould technology). Because of the low viscosity, high surface texture details can be formed.

Preferably, the composition has a dynamic viscosity, measured at a shear rate of 1/s lower than 35,000 mPa·s when it arrives on to at least a portion of the solid surface. A material having such a dynamic viscosity proves to adhere well to glass panels (or to panels made of other materials), and proves to be suitable for producing gaskets with detailed surface textures such as leather imitation texture. The low viscosity of the composition allows the composition to flow into the surface textures of the mould so that the gasket copies (in negative) the texture of the mould. In this manner, the texture of the gasket can be predefined.

Preferably, the second mould part is movably mounted with respect to the first mould part so that the closed cavity can be opened by moving the second mould part. Such movably second mould part allows to automate the gasket and panel assembly producing process, and simplifies the removing of the panel and gasket assembly from the mould.

Preferably, the mould further comprises a guide extending along at least said portion of the periphery of the panel, which guide is provided for guiding the applicator device along the portion of the periphery of the panel, and in a position where the applicator device applies a force to the resilient lip thereby displacing the resilient lip to provide access to the closed cavity. Such guide allows the applicator device to move along the periphery of the panel thereby displacing the lip and applying the composition in the closed cavity, at a predefined speed. This significantly simplifies the producing of the gasket. The guide can be formed as a rail or alternatively can be formed as a robot arm that is programmed to follow a predetermined trajectory.

Preferably, the resilient lip is formed at the second mould part at an intersection with the first mould part, wherein the first mould part comprises a cutting edge forming an abutement for the resilient lip. When the resilient lip abuts against a cutting edge, excessive material flowing out of the closed cavity via the resilient lip is cut off from the gasket formed in the closed cavity, by the tendency of the resilient lip to reclose the cavity. As a further result, when the gasket is produced and removed from the mould, no further production step is required to finish the edges of the gasket since excessive material is already cut off from the outer end of the gasket by the cutting edge.

Preferably, the mould comprises a support that is rotatable around at least one laying axis such that the orientation of the first mould part, the second mould part and the panel is adaptable to position a first segment of said portion of the periphery of the panel, lower than a second segment of the portion of the periphery of the panel. By providing the mould on a rotatably support which is rotatable around at least one laying axis, the mould, and thus the cavity, can be oriented. This allows the cavity to be oriented such that one segment of the cavity is arranged in a lower region than other segments of the cavity. When applying the composition into such lower section of the cavity, the composition will tend to flow into the lower section due to the gravity forces, thereby completely filling the closed cavity. In this manner, a smooth filling of the cavity can be obtained by orienting the mould via the rotatably support.

BRIEF DESCRIPTION OF THE DRAWINGS

Other particularities and advantages of the invention will become apparent from the following description of some particular embodiments of the method and the panel assembly according to the present invention. The reference numerals used in this description relate to the annexed drawings wherein.

DETAILED DESCRIPTION

Figure 1:
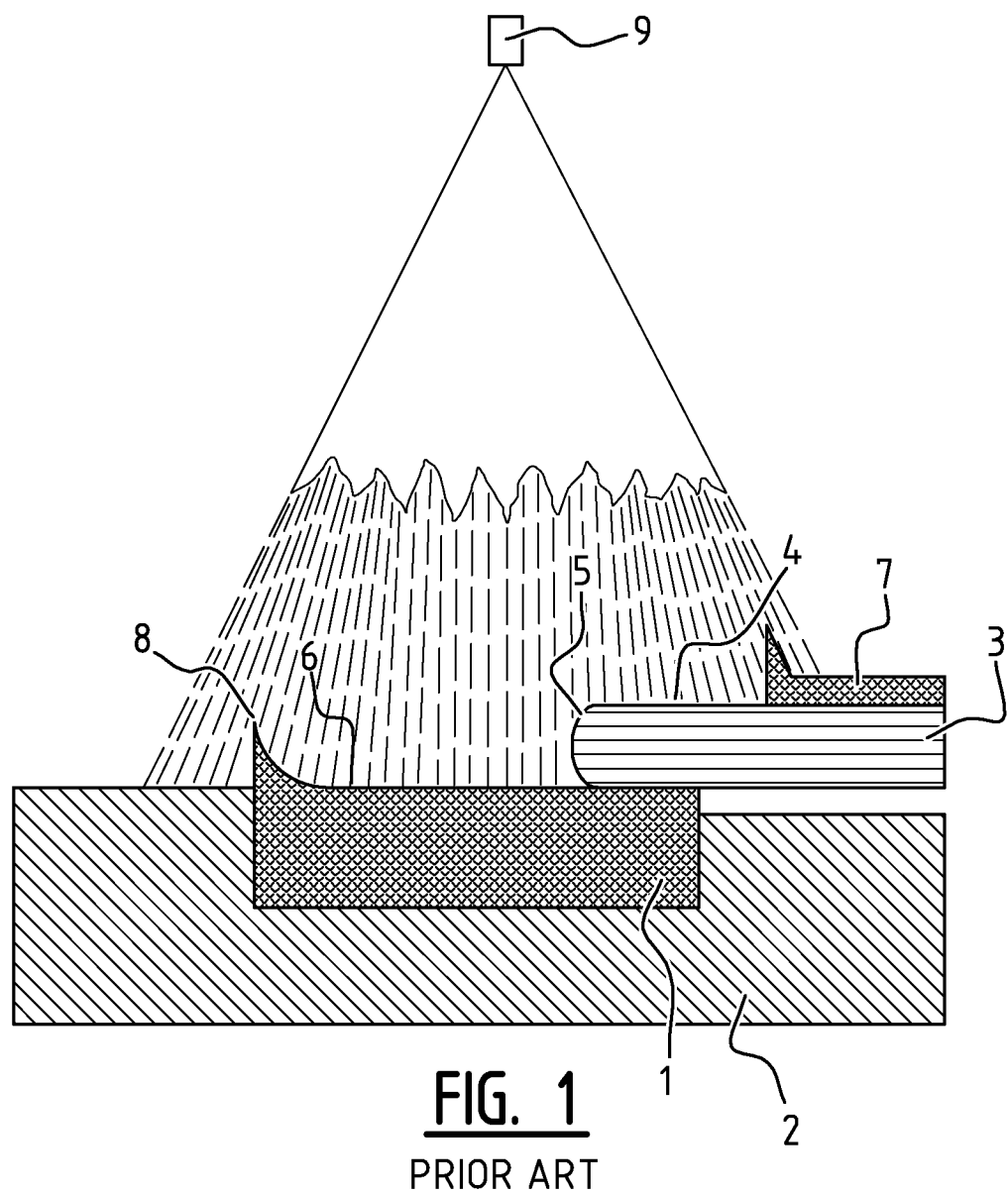
FIG. 1 illustrates an open mould according to the prior art.

In the prior art method illustrated in FIG. 1 a gasket is provided by means of a spray process onto a glass panel 3, for example a glass panel arranged to be mounted in a vehicle opening. Since the invention is based on this prior art technique, the latter is explained in detail. The skilled person will understand that many of the details are equally applicable to the method and mould of the present invention, and that the purpose of explaining these details is to better understand the features and alternative embodiments of the present invention.

The gasket adheres to a portion of the panel 3 and extends along at least a portion of the periphery thereof. Instead of providing the gasket on a glass panel, it is also possible to apply it on other types of panels such as on sheet metal or on synthetic panels such as polycarbonate panels, or on solar panels. The gasket forms in particular an edge moulding which acts as a means for closing or covering the gap between the panel and the edge of the opening wherein the panel is to be mounted. Consequently, in a top plan view, seen in a direction perpendicular to the major faces of the panel, the gasket has generally a smaller surface area than the panel.

The glass panel 3 has a major face 4 and a peripheral edge face 5. In the illustrated embodiment, the glass panel is placed with a lower face onto the surface 6 of a first mould part so that a portion of the mould surface 6 projects beyond the peripheral edge face 5 of the panel. In this way a gasket, in particular an encapsulation, having a high dimensional accuracy, will be formed around at least a portion of the periphery of the panel 3 thus enabling a perfect continuity between the panel assembly and the car body. Before placing the panel 3 against the mould surface, it is preferably cleaned and primed to enhance the adherence of the gasket to the panel.

The mould surface 6 of the mould is formed by a resilient part 8 that is received in a groove in a metal support part 2, the resilient part 8 and metal support part 2 together forming the first mould part. The mould surface 6 is flush with the lower surface of the glass panel 3. However, it is clear that it is for example also possible to shape the mould surface so that it has a recessed portion situated in front of the lower surface of the glass panel. In this way the gasket will extend partially over the lower face of the glass panel 3.

According to the prior art, a gasket is produced by spraying a curable composition onto the panel and mould. The curable composition is then allowed to cure and the panel and the gasket produced thereon are removed from the mould. In the method according to the prior art, the curable composition is applied by means of an applicator device 9 moving along at least said portion of the periphery of the panel 3 and spraying or dripping the composition onto the panel and/or mould.

Figure 2:
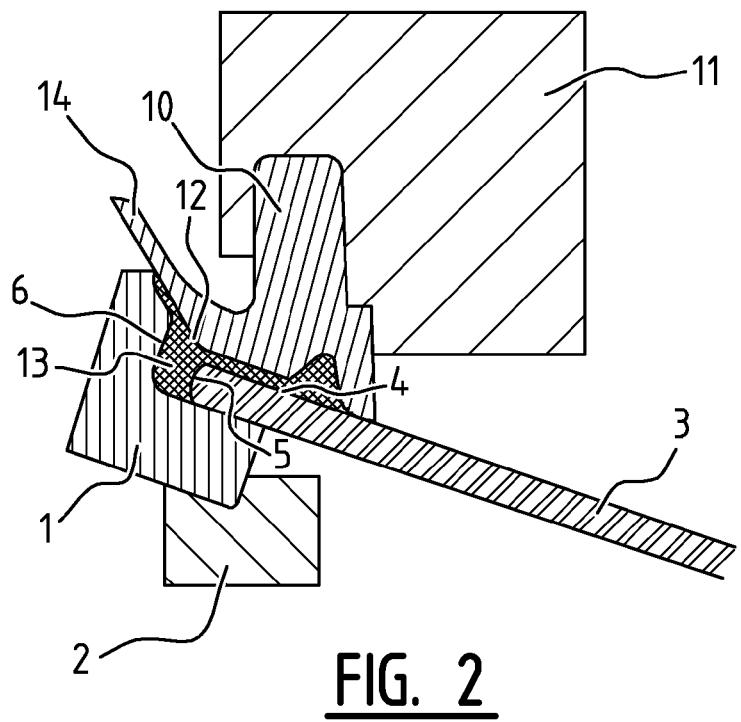
FIG. 2 illustrates a mould according to an embodiment of the invention.

FIG. 2 shows an embodiment according to the invention. FIG. 2 shows a first mould part, being formed in two pieces being a resilient mould part 1 and a first mould part support 2 provided for supporting the resilient first mould part 1. The figure further shows a second mould part being formed of a resilient second mould part 10 and a second mould part support 11, provided for supporting the resilient second mould part 10. The figure further shows a panel 3 of which the peripheral edge 5 is enclosed by the first and second mould parts 1, 10. Thereby a closed cavity 13 is formed by the combination of the first mould part surface 6 of the first mould part 1, the peripheral edge face 5 and major face 4 of the panel 3, and the second mould part surface 12 of the second mould part 10. The closed cavity 13 is defined by inner boundaries that form the solid surface against which the composition is applied to produce the gasket.

By defining a closed cavity 6, the complete cross-sectional shape, as well as the texture on all sides of the gasket can be predefined. On the contrary, prior art systems (as shown in FIG. 1) only allow to predefine the lower side shape and texture of the gasket. It is not possibly according to the prior art to produce a gasket, as is shown in FIG. 2, with a bulge above the major face 4 of the panel 3.

It will be clear for a skilled person that the first mould part support 2 supporting the resilient part of the first mould part 1 is only schematically shown, and a pratical implementation of a resilient mould part supported by a mould support can be formed in many different ways wherein the resilient mould part can have different forms and shapes and be connected to the mould support part in different manners. In the present invention, preferably, the resilient mould part 1 comprises the first mould surface 6. This first mould surface 6 forms a part of the solid surface against which the composition is applied to form the gasket. The advantages of using a resilient mould are explained in the further description. Also, preferably according to the invention, the first mould part 1 is formed such that the panel 3 is in contact with the resilient mould part, as is shown in FIG. 2. As explained in the further description, this minimizes glass breaking and maximizes leak prevention. Similarly, the second mould part 10 and second mould part support 11 can be shaped and interconnected in different manners.

The second mould part 10 comprises a resilient lip 14. The resilient lip 14 is so formed that when the second mould part 10 abuts against the major face 4 of the panel (on the right hand side of the second mould part 10 in FIG. 2), the resilient lip 14 abuts against the first mould part 1 to thereby close the cavity 13 (this closed position being the rest position of the lip 14). Thereby, the second mould part 10 comprises a second mould part surface 12 that forms a part of the inner boundaries of the cavity 13.

Figure 3:
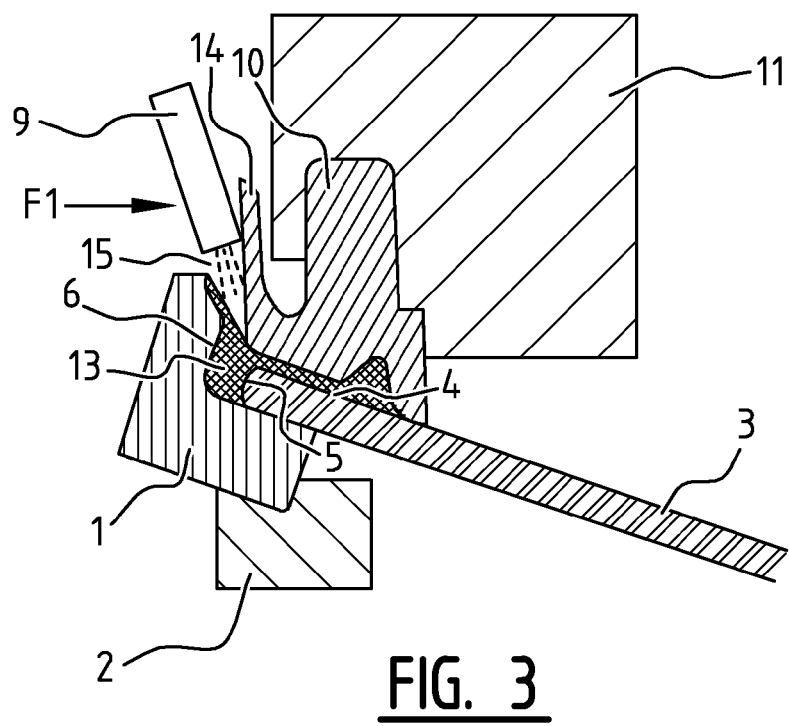
FIG. 3 illustrates a mould of FIG. 2 wherein an applicator device displaces the resilient lip to provide access to the closed cavity.

FIG. 3 shows how the resilient lip 14 of the second mould part 10 is displaced by an applicator device 9. To this end, the applicator device 9 pushes against the resilient lip 14 with a force F1. Application of the force F1 by the applicator device 9 to the resilient lip 14 has as a result that the cavity 13 is locally opened. Via the so-formed opening, the applicator device 9 can apply composition 15 into the cavity 13 for forming the gasket. It will be clear that the resilient lip 14 is formed such that when the applicator device 9 is moved away from the lip, the resilient lip 14 tends to move back into its rest position.

Preferably, the first mould surface 6 is provided, opposite the panel 3, with a cutting edge. Due to the sharp top of this edge (curvature radius preferably smaller than 1 mm), no or only a limited amount of curable composition remains on the top of this edge after over-flow of composition. As a result, no cutting step is required to separate any over-flow on the mould surface from the gasket 13 after production thereof. Preferably, the resilient lip abuts against the cutting edge of the first mould part 1, as is shown in FIG. 2. The advantage of abutting against a cutting edge is that excessive material in the cavity can be pushed out of the cavity by the tendency of the resilient lip 14 to move back into its rest position, and excessive material is pushed over the cutting edge and the resilient lip closes against the cutting edge, thereby cutting off excessive material from the gasket. This effect minimizes the necessity of a further production step for finishing the outer edges of the formed gasket 13.

Figure 4:
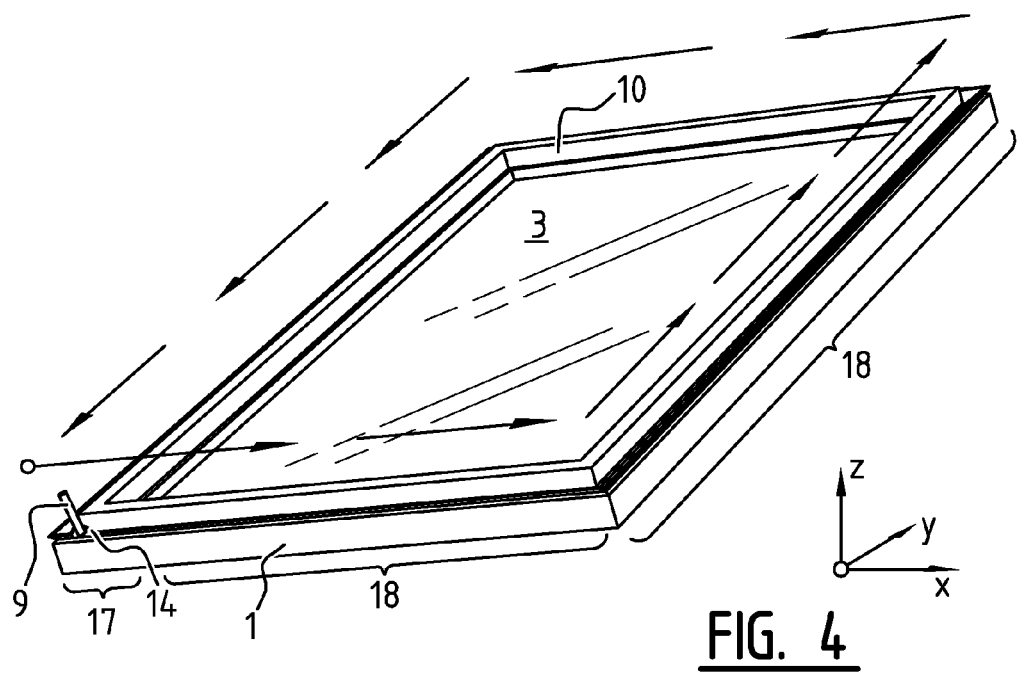
FIG. 4 illustrates a mould according to a further embodiment of the invention.

FIG. 4 shows a glass panel 3 that is placed on top of a first mould part 1. A second mould part 10 is placed on top of the first mould part 1 and the panel 3 to form a closed cavity. According to the example as shown in FIG. 4, the complete periphery of the panel 3 is to be finished by forming a gasket. It will be clear for a skilled person that the invention is equally applicable when only parts of the periphery of a panel 3 is to be finished with a gasket. Alternatively, some situations might require a portion of the panel 3 to be finished using the open mould technology according to the prior art, while another part of the panel is finished by applying a closed mould according to the invention.

In FIG. 4, a 3-dimensional coordinate system is drawn, showing an X, a Y and a Z axis. Comparing these axes to the orientation of the panel 3, shows that the panel 3 is not oriented in a horizontal position. The panel 3 is tilted with respect to the horizontal position (defined by the X and Y axis), so that a first segment 17 of the periphery of the panel 3 is located below other segments 18 of the periphery. This first, lower, segment 17 forms the starting point for the production of the gasket. In this first segment 17, injection of the composition into the cavity 13 via the applicator device 14 is started. To this end, the applicator device 9 pushes against the resilient lip 14 of the second mould 10 to thereby gain access to the cavity. FIG. 4 shows the starting position of the applicator device 9. After starting of the injection (which will be described in more detail hereunder), the applicator device is moved in the direction of the arrows along the periphery of the panel 3 while injecting composition into the cavity. In this manner, the cavity is oriented to be inclined with respect to the horizontal plane.

The cavity 13 has a predetermined cross-sectional area. This cross-sectional area can for example be expressed in $m^2$. When the applicator device moves along the periphery of the panel 3, the moving speed of the applicator device can be expressed in m/s. Therefore, the volume of cavity that is passed by the applicator device moving along the periphery, is the product of the moving speed and the cross-sectional area of the cavity and can thus be expressed in $m^3/s$. On the other hand, a volumetric flow rate can be controlled, for example by controlling a pump that displaces the composition, with which flow rate the applicator device injects the composition into the cavity. Volumetric flow rate is expressed in $m^3/s$. The above shows that a comparison can be made between on the one hand the volumetric flow rate with which the applicator device injects the composition, and on the other hand, the volume of cavity that is passed by the applicator device moving along the periphery of the panel 3 (hereafter referred to as passed cavity). Since the cross-sectional area of the cavity is predetermined, two parameters are available to be influenced/adapted for correlating the volumetric flow rate with the passed cavity, these parameters being the volumetric flow rate (pumping speed) and the moving speed of the applicator device.

In a first section 17, at the start of the production process of the gasket, the parameters are preferably chosen so that the volumetric flow rate is higher than the passed cavity to thereby provide an 'overdose' of composition by the applicator device into the cavity. As a result, the composition will flow into the lower areas of the cavity, and will be allowed to at least partially cure in these lower areas, thereby forming a stop in the cavity that prevents composition from flowing through the cavity past the stop. In a further production stage, when the applicator is moved to a further sections 18 of the periphery of the panel 3 (after the first stage is passed and the stop is formed), the parameters are preferably chosen such that the passed cavity is substantially equal to the volumetric flow rate. Thereby, a substantially 'exact' quantity of composition is injected into the cavity for filling the cavity. Such dimensioning of volumetric flow rate and moving speed allows to avoid expelling of excessive composition out of the cavity. Thereby, an efficient filling of the cavity is obtained.

In the further middle stage of the producing of the gasket, where the further segments 18 of the cavity are filled, it is advantageous when the panel 3 is positioned such that the cavity is oriented at least slightly upward. When the cavity is oriented slightly upward, the injected composition, which tends to flow to the lowest areas due to the gravity force, flows towards the previously filled segments of the cavity, thereby gradually and completely filling the cavity with composition. In FIG. 4 two sides of the panel 3 that are marked with the number 18 (on the lower side and the right-hand side of the figure) are positioned such that the cavity is upwardly oriented. Depending on the particular situation, filling of the cavity could be compromised when the applicator device moves along the complete periphery of the panel 3 as is shown in FIG. 4, particularly for the parts of the cavity that are not oriented upward. Therefore, filling of the cavity in the example of FIG. 4 is preferably executed in two possible manners.

In a first one of the two possible manners the filling of the cavity is executed in two stages, where the panel is reoriented after filling of two (upwardly oriented) of the four edges of the periphery. Reorienting of the panel allows to position the panel so that the further two of the peripheral edges can be filled with the applicator device moving along an upwardly oriented cavity.

According to a second of the two possible manners, the panel 3 is placed on a rotatable support that can rotate around one or preferably two horizontal axes, and whereby the panel 3 is reoriented during application of the composition into the cavity to orient the cavity section to be filled upwardly (meaning above the cavity section that has just previously been filled and below the cavity section that is to be filled).

Other alternatives where two applicator devices are used can also be suitable for filling the cavity, as the skilled person will readily understand from the above description.

Figure 5:
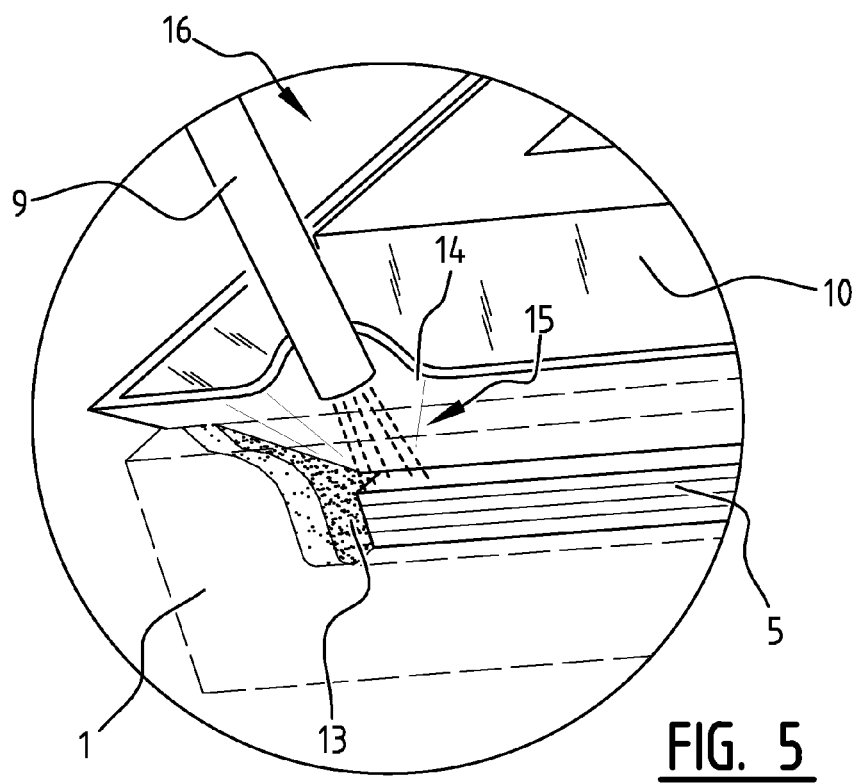
FIG. 5 shows a section of FIG. 4 in more detail.

FIG. 5 shows a close-up of the starting position of the applicator device 9 from FIG. 4 and shows how the resilient lip 14 is displaced, thereby providing access to the cavity 13. Via this provided access, the applicator device 9 can inject composition 15 into the cavity 13, thereby filling the cavity 13 so that a gasket can be formed.

Additionally to the forming of the gasket, different types of inserts can be connected to the panel and gasket assembly by moulding these inserts in the gasket. Examples of such inserts are electrical wires, a mirror support, alarm sensors, switches, "Einfassrahmen", water deflectors, curtain guiding rails etc. The insert could be positioned onto the mould surface. Preferably the insert is accurately positioned into the mould cavity, and is anchored onto the panel and gasket assembly by executing the method according to the invention. By allowing the composition to cure, the insert is made part of the panel and gasket assembly. Positioning of the inserts in the cavity can be obtained via any method, using any tool that is known to the skilled person for this purpose.

The curable composition may either be a non-thixotropic (Newtonian) or a thixotropic (non-Newtonian) material or liquid. In order to be able to obtain a good surface quality without having to exert a too high pressure onto the curable composition applied onto the mould surface, the curable composition has a dynamic viscosity, measured at a shear rate of 1/s, lower than 100,000 mPa·s, preferably lower than 75,000 mPa·s, more preferably lower than 35,000 mPa·s and most preferably lower than 10,000 mPa·s when applying it on at least a portion of the mould surface (for Newtonian liquids, the dynamic viscosity is not dependent of the shear rate and can be determined in accordance with ASTM D445-03). The lower the viscosity, the better the surface quality will be. In this respect, when arriving onto the mould surface, i.e. when covering a first portion of the mould surface, the curable composition has a dynamic viscosity which is preferably even lower than 10,000 mPa·s, more preferably even lower than 5,000 mPa·s and most preferably even lower than 2,000 mPa·s. In order to achieve such viscosities, a suitable formulation can first of all be selected for the curable composition. Moreover, the dynamic viscosity of a particular formulation can be lowered by increasing the temperature of the curable composition. The curable composition can be applied for example at room temperature. However, in order to speed up the curing reaction, the curable composition can also be applied at a higher temperature, for example at 65 DEG C., either onto a non-heated surface or onto a surface heated to for example 45 DEG C. When the curable composition is applied directly onto the entire mould surface, it has the required lower viscosity when being applied onto the entire mould surface.

In this regard, it is preferred that the curable composition is applied and allowed to cure until the gasket is produced (i.e. until it can be demoulded substantially without causing a permanent deformation of the gasket) more particularly without exerting a pressure in the closed cavity which is higher than 500 mbar, preferably without exerting a pressure in the closed cavity which is higher than 350 mbar, more preferably without exerting a pressure in the closed cavity which is higher than 150 mbar. In this regard, the resilient lip 14 of the second mould part 10 is preferably designed so that it opens (meaning the lip displaces away from the cutting edge of the first mould part 1 as a result of the internal pressure) when the internal pressure in the cavity is higher than 500 mbar, preferably higher than 350 mbar, more preferably higher than 150 mbar. In this regard, the environmental pressure is assumed to be the reference pressure (zero bar).

As a result of such low pressures, the panel does not have to be pressed with a great pressure onto the mould surface to avoid flash formation and the mould surface does not have to be made of a robust material, such as metal. Instead, the mould surface 6 may be made at least partially, but preferably substantially entirely, of a resilient material having in particular a shore A hardness smaller than 90, and preferably smaller than 60. The mould surface can for example be made (at least partially) of a silicone material. An advantage of such a softer (resilient) material is that an effective sealing is achieved between the mould surface and the panel without having to provide separate seals on the mould surface. Moreover, some soft materials such as silicones do not adhere to the gasket so that no external release agent has to be applied. Finally, it is much easier to make mould surfaces of a softer material than for example of metal so that the moulds will not only be less expensive but the design thereof can be changed more easily. Silicone moulds can be produced for example in a mother mould. In this way, damaged moulds can be replaced at little expense and it is also possible, without excessive costs, to provide more moulds in order to increase the production capacity. In view of the resilient properties of the mould surface, the mother mould has not to be made as accurately as the RIM moulds used in the prior art methods. It will be clear however for a skilled person that an embodiment where the mould (except for the resilient lip) is formed of a hard material such as a metal is also applicable in the invention, and the invention is not limited to softer moulds. A metal mould can for some applications still effectively seal the panel from the mould surface when the panel is for example a solar panel with a flat surface (flat surfaces typically show less dimensional tolerances).

The curable composition comprises preferably a polyurethane reaction mixture, for example a polyurethane reaction mixture as disclosed for example in EP-B-0 379 246 (which is taken up herein by way of reference) comprising a polyol and an isocyanate component. The curable composition is preferably formulated to produce an elastomeric polyurethane material having a density higher than 400 kg/m$^3$, and preferably higher than 500 kg/m$^3$. Lower densities are however also possible. In particular it is possible to add a blowing agent, or a larger amount of blowing agent, so that a foam will be produced having in particular a density lower than 400 kg/m$^3$, and more particularly lower than 250 kg/m$^3$.

Preferably, the mould part 8 is made of a self-release material to which the curable composition does not adhere so that no external release agent has to be applied. An example of such a self-release material are the soft silicone materials described hereabove. Other examples are materials like polytetrafluoroethylen (PTFE).

In order to achieve a light stable gasket, the gasket can be made of the light stable curable aliphatic polyurethane compositions disclosed in EP-B-0 379 246. However, a light stable gasket can also be achieved by means of an aromatic polyurethane composition by covering it with a light stable layer. This layer can be an in-mold paint, in particular a water- or solvent-based paint, or a layer of a curable aliphatic polyurethane composition.

The gasket obtained in the method according to the invention does not necessarily extend around the entire periphery of the panel. In case it does, no additional process step is required to finish any seams between the start and end locations or at the location of sharp corners. When injecting the curable composition into the closed cavity, the applicator can follow the periphery of the panel, but preferably moves along each of the sides of the panel and moves forward when arriving at the corners, with the injecting being preferably interrupted when arriving at or having passed the corner. After having been moved to the correct position to inject the next side of the panel injecting is started again and the applicator device is moved along the next side.

The skilled person will readily understand that different features that are described above in relation to different figures and examples can be recombined into new embodiments of the present invention. Therefore different features of specific examples will be understood by the skilled person as preferred features of the invention rather than as particular features of that specific example.

It will be clear that the above description and examples only serve the purpose of understanding and explaining the invention in great detail. These examples cannot be used to interpret the scope of protection in a limited way since the scope of protection is solely defined in the claims.

The invention claimed is:

1. A method for producing a panel assembly comprising a panel and a gasket, which gasket is adhered to the panel, extends along at least a portion of the periphery thereof and has a surface moulded against a solid surface, the method comprising the steps of:
   providing a first mould part having a first mould surface forming a first part of said solid surface;
   placing the panel and the first mould surface against one another;
   producing said gasket, by means of an applicator device moving along at least said portion of the periphery of the panel, forming a second part of said solid surface, while applying a composition onto said solid surface, the gasket being produced by allowing said composition to cure against said solid surface;
   removing the panel and the gasket produced thereon from the mould;
   wherein the composition has a dynamic viscosity, measured at a shear rate of 1/s, lower than 35000 mPa·s when it arrives onto at least a portion of the solid surface, wherein the method further comprises:
   providing a second mould part having a second mould surface forming a third part of said solid surface; and
   placing the second mould part against the first mould part and the panel so that a closed cavity is formed the inner boundaries of which form said solid surface defining substantially the complete shape of the gasket;
   wherein at least one of the first mould part and second mould part comprises a resilient lip extending along at least said portion of the periphery of the panel, the method further comprising while producing said gasket:
   displacing said resilient lip by said applicator device to provide access to the closed cavity.

2. The method according to claim 1, wherein the method further comprises controlling a moving speed of said applicator device and a volumetric flow rate of said applying said composition such as to completely fill said closed cavity with said composition.

3. The method according to claim 2, wherein the moving speed and/or volumetric flow rate is controlled such that in a starting stage of said producing said gasket, the volumetric flow rate is higher than the volume of the inner cavity that is passed at said moving speed thereby providing an overdose of composition.

4. The method according to claim 2, wherein the moving speed and/or volumetric flow rate is controlled such that in a middle stage of said producing said gasket, the volumetric flow rate is substantially equal to the volume of the inner cavity that is passed at said moving speed.

5. The method according to claim 1, wherein the method further comprises, before producing said gasket, positioning said mould such that a first segment of said portion of the periphery of the panel is arranged to be located lower than a second segment of said portion of the periphery of the panel.

6. The method according to claim 5, wherein said producing of said gasket starts at said first segment.

7. The method according to claim 1, wherein the second mould part is moveably mounted with respect to the first mould part, wherein the method comprises before the producing of the gasket, moving the second mould part towards the first mould part and the panel to form the closed cavity, and wherein the method comprises after the producing of the gasket, moving the second mould part away from the first mould part and the panel to open the closed cavity.

8. The method according to claim 1, wherein at least one of the first mould part and second mould part is formed at least partially by a resilient material having a shore A hardness smaller than 90.

9. The method according to claim 1, wherein the applying step comprises the step of allowing the curable composition to flow out of the closed cavity via an opening temporarily formed by said resilient lip.

10. A mould for producing a panel assembly comprising a panel and a gasket, which gasket is adhered to the panel, extends along at least a portion of the periphery thereof and has a surface moulded against a solid surface, the mould comprising a first mould part having a first mould surface, and a second mould part having a second mould surface, the first and second mould part being formed such that at least said portion of the periphery of the panel can be enclosed thereby forming a closed cavity the inner boundaries of which are formed by a combination of said first mould surface, said second mould surface and said portion of the periphery of the panel, wherein said solid surface is formed by the inner boundaries of the cavity, and wherein at least one of the first mould part and second mould part comprises a resilient lip extending along at least said portion of the periphery of the panel, the resilient lip being provided for being displaced by an applicator device to provide access to the closed cavity.

11. The mould according to claim 10, wherein said composition has a dynamic viscosity, measured at a shear rate of 1/s, lower than 35000 mPa·s when it arrives onto at least a portion of the solid surface.

12. The mould according to claim 10, wherein said second mould part is moveably mounted with respect to the first mould part so that the closed cavity can be opened by moving the second mould part.

13. The mould according to claim 10, further comprising a guide extending along at least said portion of the periphery of the panel, which guide is provided for guiding said applicator device along said portion of the periphery of the panel and in a position where said applicator device applies a force to said resilient lip thereby displacing said lip to provide access to the closed cavity.

14. The mould according to claim 10, wherein said resilient lip is formed at the second mould part at an intersection with said first mould part, wherein the first mould part comprises a cutting edge forming an abutment for said resilient lip.

15. The mould according to claim 10, wherein said mould comprises a support that is rotateable around at least one laying axis such that the orientation of the first mould part, the second mould part and the panel is adaptable to position a first segment of said portion of the periphery of the panel lower than a second segment of the portion of the periphery of the panel.

* * * * *